US012162302B2

(12) United States Patent
Chen

(10) Patent No.: US 12,162,302 B2
(45) Date of Patent: Dec. 10, 2024

(54) 3D POP-UP CARD

(71) Applicant: JAST Gifts Shenzhen Company Limited, Shenzhen (CN)

(72) Inventor: Jen-Lin Chen, Cupertino, CA (US)

(73) Assignee: JAST Gifts Shenzhen Company Limited, Shenzhen (CN)

( * ) Notice: Subject to any disclaimer, the term of this patent is extended or adjusted under 35 U.S.C. 154(b) by 120 days.

(21) Appl. No.: 17/966,903

(22) Filed: Oct. 17, 2022

(65) Prior Publication Data

US 2024/0017561 A1 Jan. 18, 2024

(30) Foreign Application Priority Data

Jul. 15, 2022 (DE) ..................... 20 2022 103 988.7

(51) Int. Cl.
*G09F 1/06* (2006.01)
*B42D 15/02* (2006.01)
*B42D 15/04* (2006.01)

(52) U.S. Cl.
CPC ......... *B42D 15/042* (2013.01); *B42D 15/022* (2013.01); *B42D 15/045* (2013.01); *G09F 1/06* (2013.01)

(58) Field of Classification Search
CPC .. B42D 15/042; B42D 15/022; B42D 15/045; G09F 1/06
See application file for complete search history.

(56) References Cited

U.S. PATENT DOCUMENTS

| | | | | |
|---|---|---|---|---|
| 10,500,887 B1 | 12/2019 | Kelly | | |
| 2005/0227214 A1* | 10/2005 | Clegg | .................. | B42D 15/022 |
| 2010/0018091 A1* | 1/2010 | Rosendale | ........... | B42D 15/047 40/442 |
| 2011/0258893 A1* | 10/2011 | Mayer | .................. | B42D 15/022 40/124.03 |

(Continued)

FOREIGN PATENT DOCUMENTS

DE 202021104469 12/2021

OTHER PUBLICATIONS

Communication Pursuant to Article 94(3) EPC Dated May 16, 2024 From the European Patent Office Re. Application No. 2220094.5 (4 Pages).

(Continued)

*Primary Examiner* — Gary C Hoge
(74) *Attorney, Agent, or Firm* — LaMorte & Associates P.C.

(57) ABSTRACT

The invention concerns a 3D pop-up card having a foldable base card which has an inner side and an outer side, the base card being foldable along a fold and being reversibly transferable from a folded, closed state to an unfolded, open state, wherein a foldable figure is fixed to the inner side of the base card and the foldable figure unfolds autonomously into a three-dimensional structure when the base card is transferred into an open state, wherein the base card is double-layered, the layer which is on the inside in the closed state having at least one slit on each of the two sides of the fold the base card and the foldable figure being connected to one another via L-shaped connecting pieces, and the first leg of an L-shaped connecting piece engaging in a slit and the second leg of an L-shaped connecting piece being attached to the foldable figure.

8 Claims, 7 Drawing Sheets

(56) References Cited

U.S. PATENT DOCUMENTS

| | | | | |
|---|---|---|---|---|
| 2016/0365010 | A1* | 12/2016 | Wise | G09F 1/06 |
| 2017/0267012 | A1 | 9/2017 | Kricman | |
| 2018/0102070 | A1* | 4/2018 | Yeh | G09F 1/08 |
| 2021/0005113 | A1* | 1/2021 | Wallen | B42D 15/042 |

OTHER PUBLICATIONS

Erweiterter Europaischer Recherchenbericht [European Search Report] Dated Aug. 10, 2023 From the European Patent Office Re. Application No. 2220094.5 (6 Pages).

* cited by examiner

3D POP-UP CARD

RELATED APPLICATION

This application claims the benefit of priority of Germany Patent Application No. 20 2022 103 988.7 filed on Jul. 15, 2022, the contents of which are incorporated by reference as if fully set forth herein in their entirety.

FIELD AND BACKGROUND OF THE INVENTION

The invention relates to a 3D pop-up card comprising a foldable base card having an inner side and an outer side, the base card being foldable along a fold and reversibly transferable from a folded closed state to an unfolded open state, wherein a foldable figure is fixed to the inner side of the base card and the foldable figure unfolds autonomously to form a three-dimensional structure when the base card is transferred to an open state.

3D pop-up cards, hereinafter also referred to simply as 3D cards, have been known for some time in a wide variety of designs and essentially comprise a generally simply folded card as a base, hereinafter referred to as a base card, and a figure arranged in this base card. The main function of such a 3D card is that an initially essentially two-dimensional compressed figure rises three-dimensionally from the card plane when the folded card is opened.

Typically, corresponding 3D cards can be opened from a closed state by unfolding the two foldable base card parts by a total of 180° into a planar plane.

The underlying mechanism is based on the fact that the compressed figure is attached to the base card in such a way that opening the folded base card applies a tensile stress to the figure, which transforms the figure from the compressed to the three-dimensional or expanded shape.

Thus, the construction of corresponding 3D cards requires, on the one hand, the formation of a figure that can be transformed from a compressed two-dimensional to a three-dimensional state, and, on the other hand, a means of fixing this figure inside the base card.

Thus, the task of the invention is to provide a design that ensures easy fixation of the figure to the base card and easy unfolding of the figure when the 3D card is opened.

This task is solved by a 3D pop-up card with a foldable base card which has an inner side and an outer side, the base card being foldable along a fold and reversibly transferable from a folded, closed state to an unfolded, open state, a foldable figure being fixed to the inner side of the base card and the foldable figure unfolding autonomously to form a three-dimensional structure when the base card is transferred to an open state, wherein the base card is double-layered and the inner layer in the closed state has at least one slit on each side of the fold, wherein the base card and the foldable figure are connected to each other via L-shaped connecting pieces and wherein the first leg of an L-shaped connecting piece engages in a slit and the second leg of an L-shaped connecting piece is attached to the foldable figure.

SUMMARY OF THE INVENTION

Advantageous embodiments are the subject of the dependent claims. It should be noted that the features listed individually in the claims can also be combined with one another in any desired and technologically useful manner and thus reveal further embodiments of the invention.

By providing a double-layer base card, it is possible according to the invention to provide slits in the inner layer which serve to fix the foldable figure via connecting pieces provided for this purpose. At the same time, the slits are not visible on the outside of the 3D pop-up card and thus do not interfere with the appearance of the card. The foldable figure is fixed in an uncomplicated manner by providing an L-shaped connecting piece for each slit. One of the two legs of the L engages in each slit, while the second leg is connected to the foldable figure. In this way, an overall connection is made between the base card and the foldable figure, which at the same time ensures that the movement of the base card during unfolding and folding is transmitted to the foldable figure. In particular, the second leg of the L-shaped connector may be glued to the inside or outside of a portion of the foldable figure.

The slits in the inner layer of the base card on the two sides of the fold can be offset from each other, the offset referring to lines parallel to the long side of the base card. The long side of the base card is considered to be a side that is orthogonal to the fold. In other words, the slits are on different parallels to the long side. The offset causes force to be applied to different portions of the foldable figure when unfolded, such as diagonally opposite portions. Accordingly, the foldable figure can be pulled apart diagonally and expanded.

It is normally sufficient if a single slit is arranged on each side of the fold. As already mentioned, these two slits are preferably arranged offset to each other, so that the two slits are arranged diagonally to each other when the base card is unfolded and open, as viewed from above. Accordingly, when the 3D pop-up card is opened, the foldable figure is pulled apart diagonally and unfolded.

Typically, the slits run essentially parallel to the fold. Accordingly, one leg of each L-shaped connecting piece can be inserted into a slit and, if necessary, bent off, and the surface of the other leg can be connected, in particular glued, to a section of the foldable figure. The connection of the L-shaped connecting piece to the slit can also be strengthened by gluing or other measures of fixation.

In most cases, the fold of the base card is arranged in the middle of the base card, i.e. the base card and thus the entire 3D pop-up card is folded in half. In principle, however, deviations from a fold in the middle are also conceivable.

The base card may be such that the inner layer of the base card in the closed state is folded onto the outer layer of the base card in the closed state. In particular, this may be the case separately on one or both sides of the fold. Accordingly, the base card may initially comprise an elongated piece of paper or cardboard folded in half on both sides of the fold parallel to the fold. However, it is also possible to provide the inner layers, for example, as separate pieces that are fixed to the outer layers.

In order to permanently join the inner layer of the base card in the closed state and the outer layer in the closed state, it makes sense to glue the layers together. In principle, other joining techniques are also conceivable, but gluing is preferred because it is easier to handle. The gluing does not have to cover the entire surface; gluing in the edge area of the respective layers is sufficient in most cases.

Preferably, the 3D pop-up card can have light and/or acoustic elements and a switch for activating the light and/or acoustic elements. The light and/or acoustic elements provide additional visual or acoustic effects, for example by playing a song adapted to the occasion of the gifting of the card, such as "Happy Birthday" or Christmas songs. Light effects can be produced using LEDs, for example, in the form of imitated fireworks. Acoustic effects can be produced with the help of a small speaker. The switch is usually designed to cause activation of the light and/or acoustic elements when the card is opened; however, a switch that can be operated separately is also conceivable.

In particular, the light and/or acoustic elements can be arranged between the layers of the base card. If these are only glued together in the edge area, an intermediate space remains which is well suited for accommodating additional elements. The corresponding elements are thus largely invisible from the outside, but can nevertheless fulfill their purpose. In the case of light elements, however, it should be noted that, in order to achieve the desired effects, these must be visible from the outside, for example by attaching LEDs to the outside or by having corresponding recesses in the card.

For the actuation of the light and/or acoustic elements, the 3D pop-up card may comprise common electronic elements such as a power supply, a switch, an integrated circuit for controlling the electronic elements, and a number of light elements and/or acoustic elements. Preferably, the electronic elements, with the exception of the light and acoustic elements, are arranged on a printed circuit board. The power source is typically a battery. The switch may also be in the form of a sensor, for example in the form of a photodiode.

The foldable, three-dimensional figure is expediently composed of a plurality of first—subsequently also horizontal—elements and a plurality of second—subsequently also vertical—elements, the horizontal and vertical elements being inserted into one another. To enable the elements to be inserted into one another, they are preferably each provided with slits that are matched to one another. When the 3D pop-up card is fully open, the horizontal and vertical elements may be perpendicular to each other. When the card is closed, however, the horizontal and vertical elements lie flat on top of each other. The designation horizontal and vertical is to be seen independently of the orientation to the base card; in particular, the three-dimensional figure can also be fixed obliquely on the base card.

The number of the respective elements can vary according to the invention. It is also not essential whether the number of horizontal and vertical elements is the same and whether the number of elements is an even or odd number.

The 3D pop-up card can be regarded as open if the opened card forms a planar plane, i.e. the two parts or halves of the card have been opened by an angle of 180° and lie next to each other in one plane. On the other hand, the card can be considered closed when the two parts or halves of the card are on top of each other and their inner sides are on top of each other.

BRIEF DESCRIPTION OF THE SEVERAL VIEWS OF THE DRAWINGS

The invention and the technical environment are explained in more detail below with reference to the figures. It should be noted that the figures show a particularly preferred embodiment of the invention. However, the invention is not limited to the embodiment variant shown. In particular, the invention encompasses, to the extent that it is technically useful, any combination of the technical features listed in the claims or described in the description as relevant to the invention.

DESCRIPTION OF SPECIFIC EMBODIMENTS OF THE INVENTION

Figure 1:
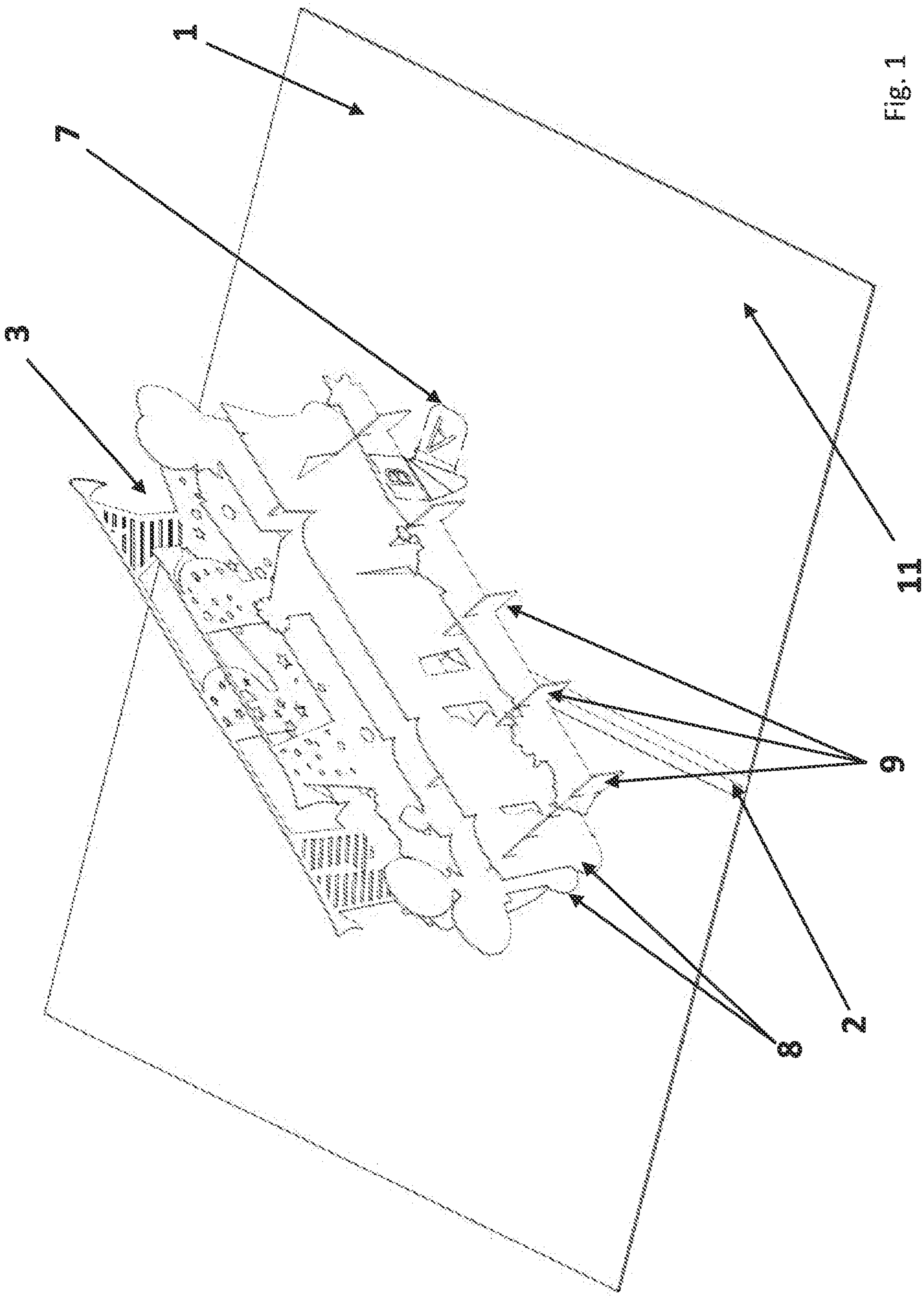
FIG. 1 shows a view of the 3D pop-up card according to the invention from an oblique top view.

In FIG. 1, the 3D pop-up card according to the invention is shown in an oblique top view. The 3D card is composed of a base card 1 and a foldable FIG. 3, the foldable FIG. 3 being made up of several horizontal elements 8 and several vertical elements 9. These interlock at slits provided for this purpose and form 90° angles when the card is unfolded. The foldable FIG. 3 is fixed to the inner side 11 of the base card 1.

Figure 3:
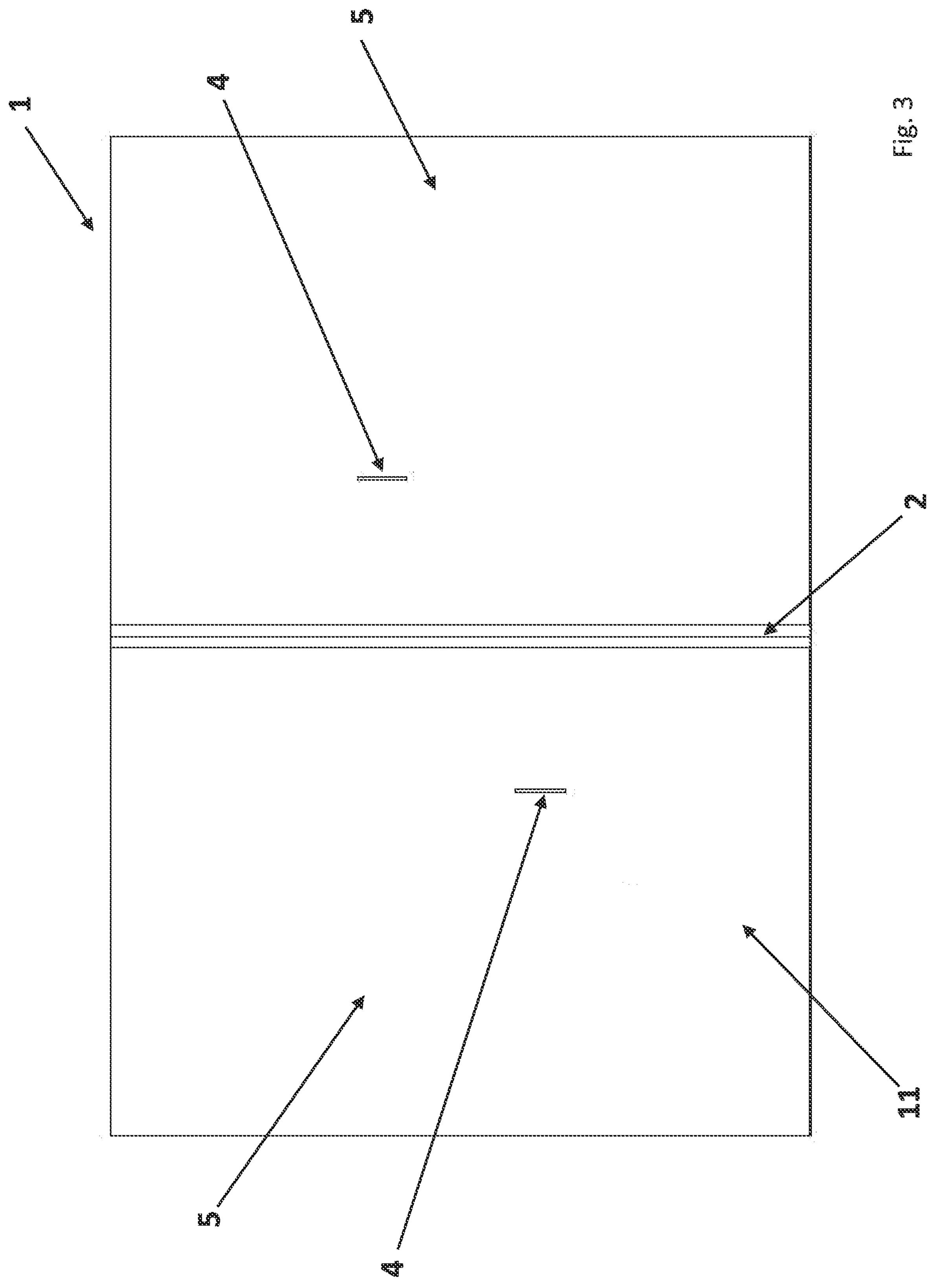
FIG. 3 shows the base card after folding.

The foldable FIG. 3 is connected to the base card 1 via L-shaped connecting pieces 7. The base card 1 can be unfolded along a fold 2 so that when the base card 1 is unfolded, the foldable FIG. 3 automatically unfolds to form a three-dimensional structure.

Figure 2:
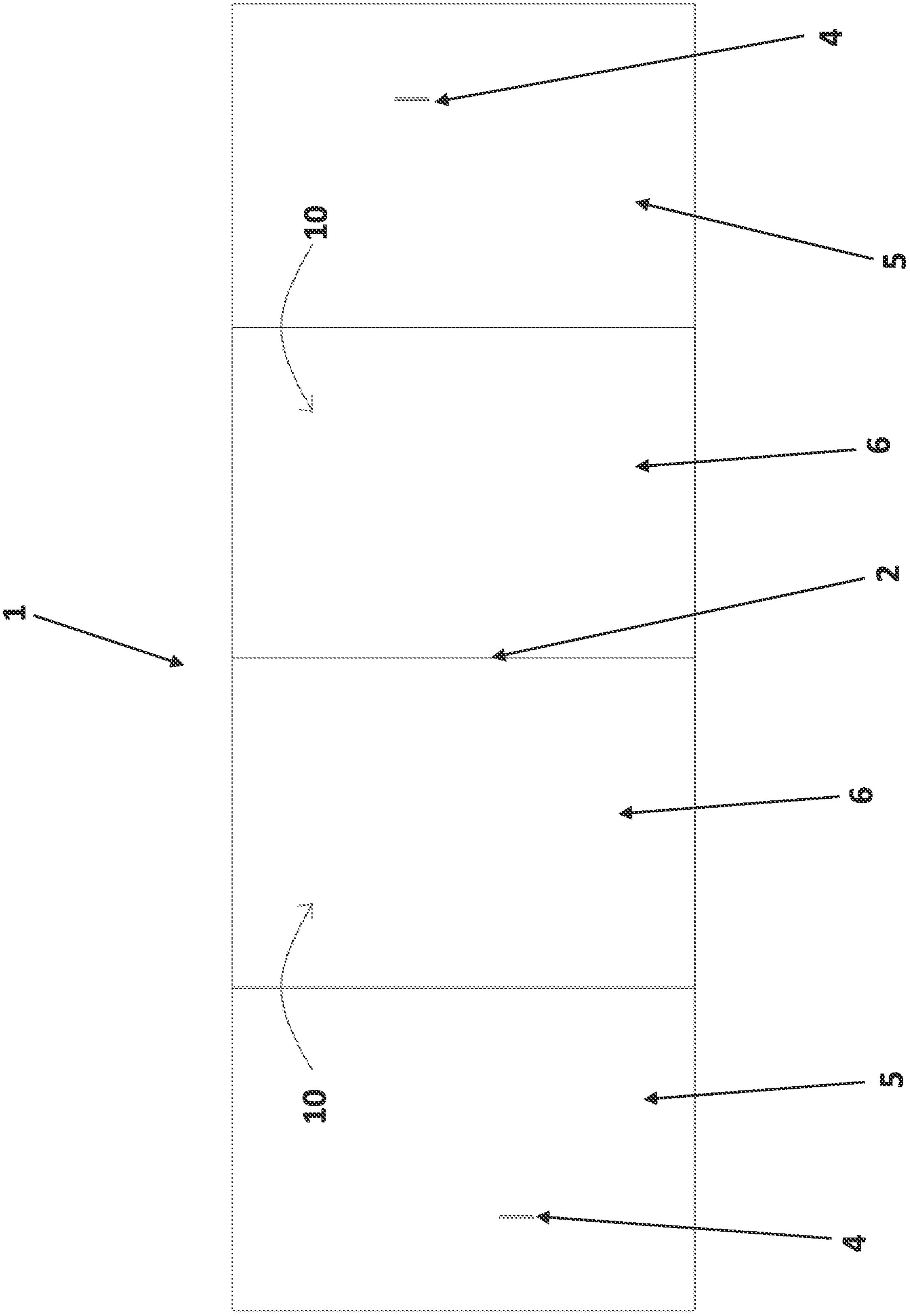
FIG. 2 shows the base card before folding.

FIG. 2 shows the base card 1 before folding. The base card 1 consists of two inner layers 5 and two outer layers 6. Along the arrows 10, the inner layers 5 are folded onto the outer layers 6. Also shown is the fold 2 along which the folding of the base card 1 takes place. Alternatively, it is also conceivable that the inner layers 5 are fixed to the outer layers 6 in some other way, for example in the form of gluing, in which case the inner layers 5 are provided as individual parts. Furthermore, slits 4 can be seen in the inner layers 5, which serve to accommodate the L-shaped connecting pieces 7.

FIG. 3 shows the base card 1 in the state after folding. The inner layers 5, which come to rest on the now no longer recognizable outer layers 6 and are generally glued to them at least at the edge areas, have slits 4 for receiving the L-shaped connecting pieces 7.

Figure 4:
FIG. 4 shows a view of the L-shaped connecting pieces.

FIG. 4 shows the L-shaped connectors 7, which are composed of two legs A, B. The first leg A is intended for insertion into a slit 4 in the base card 1, the second leg B for attachment to the foldable FIG. 3.

Figure 5:
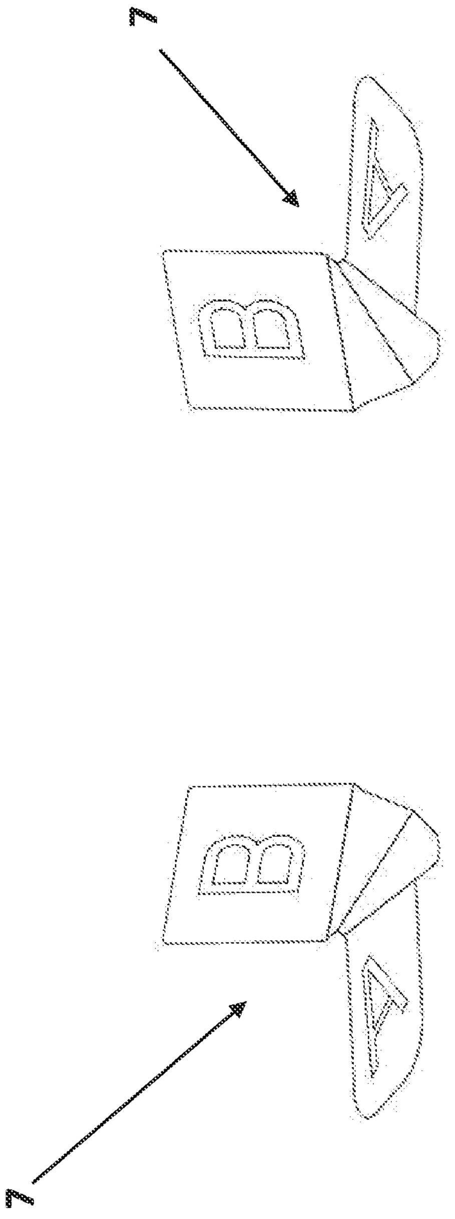
FIG. 5 shows another view of the L-shaped connecting pieces.

FIG. 5 shows another illustration of the L-shaped connecting pieces 7 in which the two legs A, B form a right angle. Depending on how far the base card 1 is folded open or closed, the angle between the two legs A, B of the L-shaped connecting pieces 7 also changes accordingly. The legs A, B are connected to one another in such a way that sufficient flexibility is provided when folding the base card 1, for example by means of corresponding indentations between the legs A, B.

Figure 6:
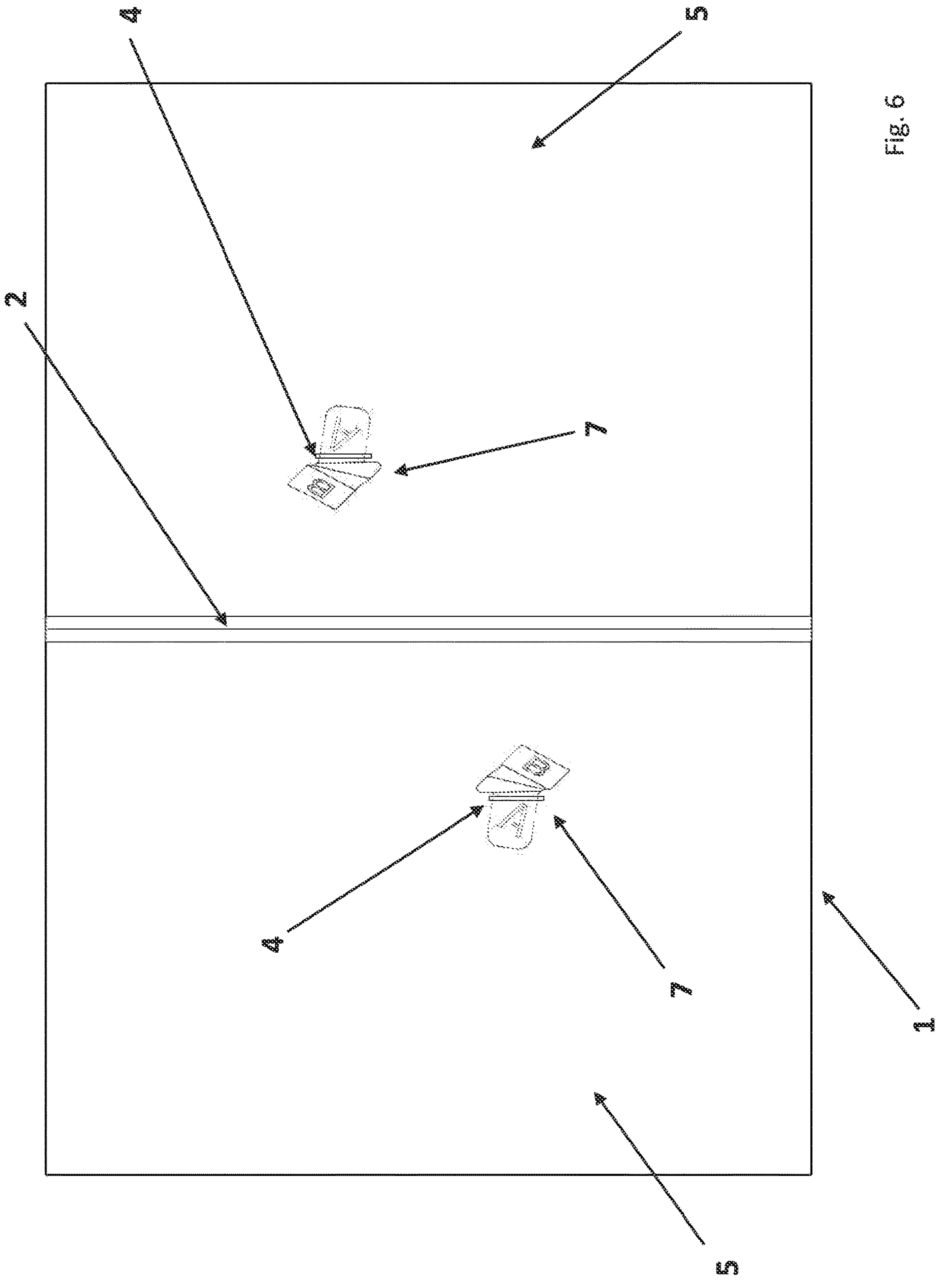
FIG. 6 shows the base card after folding with inserted L-shaped connecting pieces.

FIG. 6 shows the base card 1 with L-shaped connecting pieces 7 inserted into the slits 4. The first legs A are inserted into the slits 4, the second legs B are available for attachment, in particular gluing, to the foldable FIG. 3.

Figure 7:
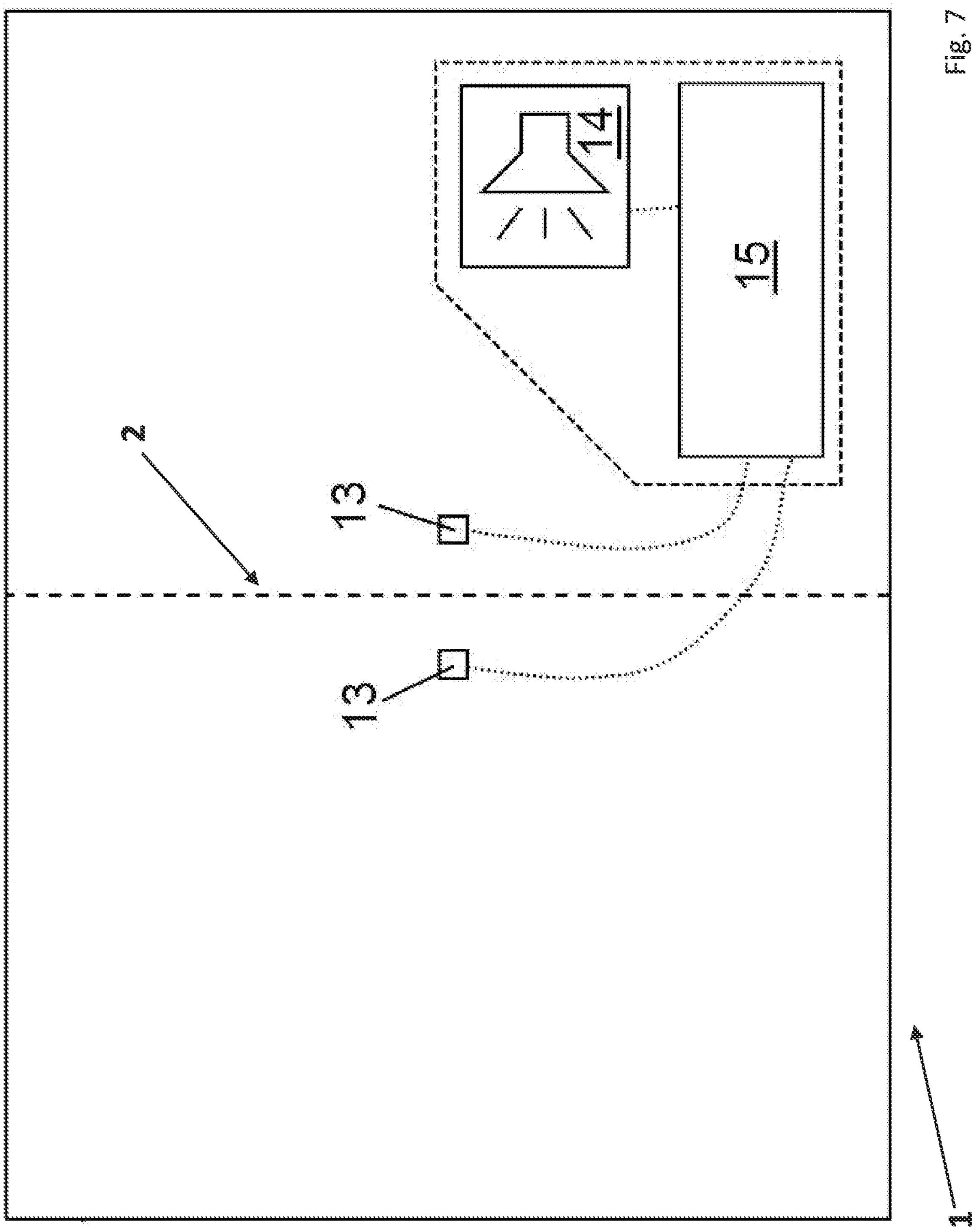
FIG. 7 shows the base card with further electronic components.

FIG. 7 shows the base card 1 with recesses 13 for light elements, the light elements being arranged in the recesses 13. Various electronic components are integrated into the base card 1, namely between the inner layer 5 and the outer layer 6. These are an acoustic element 14 and a printed circuit board 15, whereby an integrated circuit, a battery and LEDs are accommodated on the printed circuit board 15. These are controlled by switches (not shown here), which cause the integrated circuit to be activated and a melody to be played when the base card 1 is unfolded.

What is claimed is:

1. A 3D pop-up card having;

a foldable base card which has an inner side and an outer side, the base card being foldable along a fold and being reversibly transferable from a folded, closed state to an unfolded, open state;

a foldable figure fixed to said inner side of said base card and said foldable figure unfolds autonomously into a three-dimensional structure when said base card is transferred into said open state, wherein said base card has at least one slit on said inner side on either side of said fold; and L-shaped connecting pieces that are separate and distinct from said foldable base card and said foldable figure, wherein each of said L-shaped connecting pieces has a first leg and a second leg with indentation folds between said first leg and said second leg, wherein each of said L-shaped connecting pieces can fold along any of said indentation folds, and wherein said first leg of each of said L-shaped connecting pieces engages said at least one slit and the each said second leg attaches to said foldable figure, therein connecting said foldable figure to said foldable base card.

2. The 3D pop-up card according to claim 1, wherein at least one slit includes slits on both sides of said fold wherein said slits are offset from each other.

3. The 3D pop-up card according to claim 1, wherein said at least one slit includes a single slit that is arranged on each side of said fold.

4. The 3D pop-up card according to claim 1, wherein said fold is centered on said base card.

5. The 3D pop-up card according to claim 1, wherein said inside layer and said outside layer of said base card are glued to one another.

6. The 3D pop-up card according to claim 1, wherein said foldable figure has horizontal and vertical elements, wherein said horizontal and vertical elements are arranged perpendicular to one another in said open state.

7. The 3D pop-up card according to claim 1, further including a light, acoustic elements and a switch for activating said light and said acoustic elements.

8. The 3D pop-up card according to claim 7, wherein said light and said acoustic elements are arranged between said inner side and said outer said of the base card.

* * * * *